US007761229B2

(12) United States Patent
Onishi et al.

(10) Patent No.: US 7,761,229 B2
(45) Date of Patent: Jul. 20, 2010

(54) UNOCCUPIED SEAT ROUTE SEARCH SYSTEM, UNOCCUPIED SEAT ROUTE SEARCH DEVICE, AND TERMINAL DEVICE

(75) Inventors: Keisuke Onishi, Tokyo (JP); Shin Kikuchi, Tokyo (JP); Hiroshi Sakamoto, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 487 days.

(21) Appl. No.: 11/720,865

(22) PCT Filed: Dec. 7, 2004

(86) PCT No.: PCT/JP2004/018207

§ 371 (c)(1),
(2), (4) Date: Jun. 5, 2007

(87) PCT Pub. No.: WO2006/061885

PCT Pub. Date: Jun. 15, 2006

(65) Prior Publication Data

US 2009/0234564 A1 Sep. 17, 2009

(51) Int. Cl.
*G01C 21/30* (2006.01)

(52) U.S. Cl. ....................... 701/209; 701/201; 701/211; 340/995.21; 705/5

(58) Field of Classification Search ................. 701/201, 701/208, 209, 211, 212; 340/990, 995.18, 340/995.21, 995.22; 705/5
See application file for complete search history.

(56) References Cited

U.S. PATENT DOCUMENTS 5,948,040 A * 9/1999 DeLorme et al. ............ 701/201

(Continued)

FOREIGN PATENT DOCUMENTS

JP 4-70963 A 3/1992

(Continued)

OTHER PUBLICATIONS

Notification of Transmittal of Translation of the International Preliminary Report on Patentability (Form PCT/IB/338) of International Application No. PCT/JP2004/018207 mailed Jun. 21, 2007 with Forms PCT/IB/373, PCT/ISA/237.

(Continued)

*Primary Examiner*—Gertrude Arthur Jeanglaud
(74) *Attorney, Agent, or Firm*—Westerman, Hattori, Daniels & Adrian, LLP

(57) ABSTRACT

An unoccupied route search system for efficiently searching for a route (transportation means used) to the destination according to presence/absence of an unoccupied set of transportation means. An unoccupied seat route searching system (10) comprises an operation data DB (52) storing operation data on operation of transportation means, a search operation data DB (37) storing operation data for search, reservation information collecting means (35) for collecting reservation information on transportation means, condition input means (22) for inputting route search conditions including a seat condition, route search means (36) for searching transportation means constituting the route according to the reservation information collected by the reservation information collecting means (22) under the route search condition while referencing the search operation data DB (37), and output means (23) for outputting the results of the route search. The route search means (36) extracts transportation means having reservation information matching the route search condition from the operation data DB (52) prior to route search, creates search operation data DB (37), and searches for a route.

18 Claims, 9 Drawing Sheets

U.S. PATENT DOCUMENTS

| | | | |
|---|---|---|---|
| 2002/0082879 A1 | 6/2002 | Miller et al. | |

FOREIGN PATENT DOCUMENTS

| | | | |
|---|---|---|---|
| JP | 2003-44553 | A | 2/2003 |
| JP | 2004-58734 | A | 2/2004 |
| JP | 2004-206482 | A | 7/2004 |
| WO | 00/55780 | A1 | 9/2000 |
| WO | 01/71619 | A1 | 9/2001 |

OTHER PUBLICATIONS

European Search Report dated Oct. 24, 2008, issued in corresponding European Patent Application No. 04822566.8.

International Search Report of PCT/JP2004/018207, date of mailing Jan. 25, 2005.

* cited by examiner

FIG.2

| PATTERN | NON-RESERVED SEATING | RESERVED SEATING | UNOCCUPIED SEATING |
|---|---|---|---|
| P0 | 0 | 0 | 0 |
| P1 | 0 | 0 | 1 |
| P2 | 0 | 1 | 0 |
| P3 | 0 | 1 | 1 |
| P4 | 1 | 0 | 0 |
| P5 | 1 | 0 | 1 |
| P6 | 1 | 1 | 0 |
| P7 | 1 | 1 | 1 |

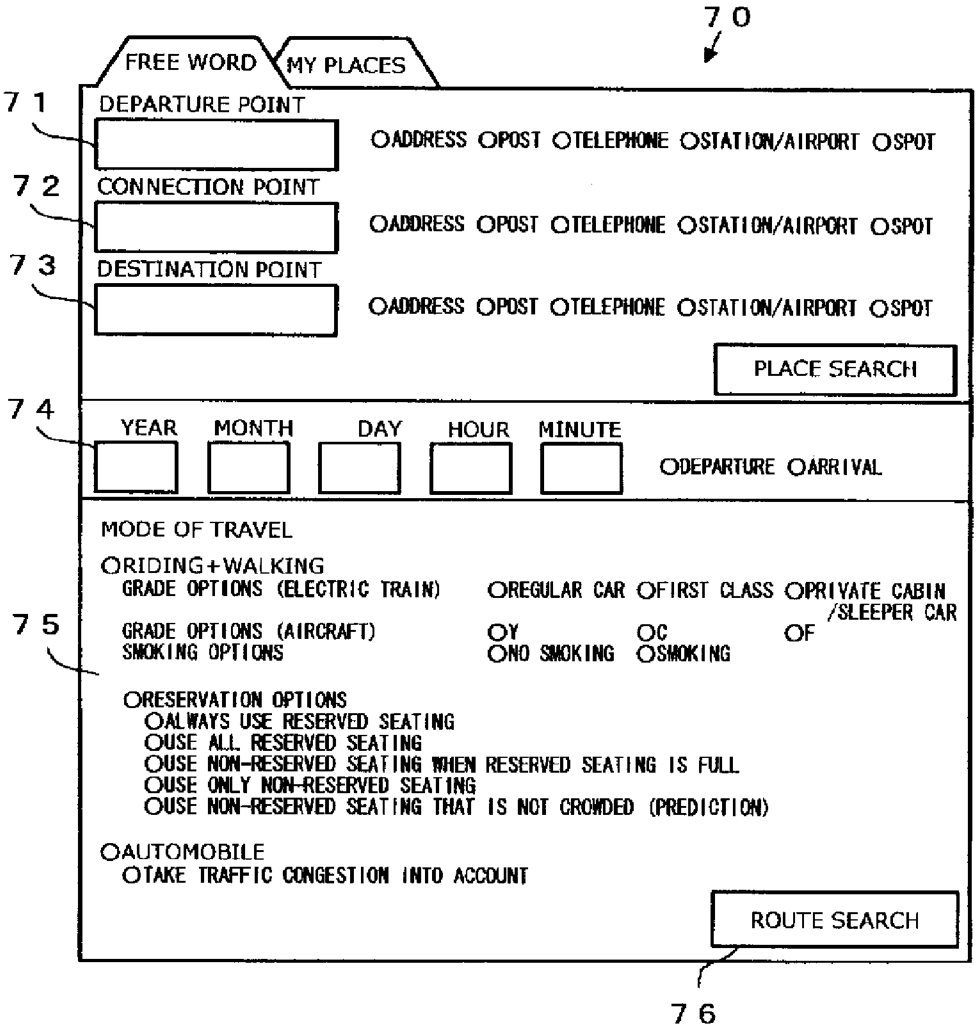

FIG.3

```
                                                          70
       ┌─FREE WORD─┬─MY PLACES─┐
71   ┌─│DEPARTURE POINT        │
     └─│  ┌────────┐                                              │
       │  │        │  ○ADDRESS ○POST ○TELEPHONE ○STATION/AIRPORT ○SPOT
72     │  └────────┘                                              │
     ┌─│CONNECTION POINT                                          │
     └─│  ┌────────┐  ○ADDRESS ○POST ○TELEPHONE ○STATION/AIRPORT ○SPOT
73     │  └────────┘                                              │
     ┌─│DESTINATION POINT                                         │
     └─│  ┌────────┐  ○ADDRESS ○POST ○TELEPHONE ○STATION/AIRPORT ○SPOT
       │  └────────┘                                              │
       │                                           ┌────────────┐ │
       │                                           │PLACE SEARCH│ │
74     │                                           └────────────┘ │
     ┌─│  YEAR   MONTH   DAY    HOUR   MINUTE                     │
     └─│  ┌──┐   ┌──┐   ┌──┐   ┌──┐   ┌──┐                        │
       │  │  │   │  │   │  │   │  │   │  │    ○DEPARTURE ○ARRIVAL │
       │  └──┘   └──┘   └──┘   └──┘   └──┘                        │
       │MODE OF TRAVEL                                            │
       │○RIDING+WALKING                                           │
       │  GRADE OPTIONS (ELECTRIC TRAIN)   ○REGULAR CAR ○FIRST CLASS ○PRIVATE CABIN
       │                                                  /SLEEPER CAR
75     │  GRADE OPTIONS (AIRCRAFT)         ○Y         ○C        ○F
     ┌─│  SMOKING OPTIONS                  ○NO SMOKING ○SMOKING
     └─│                                                          │
       │  ○RESERVATION OPTIONS                                    │
       │     ○ALWAYS USE RESERVED SEATING                         │
       │     ○USE ALL RESERVED SEATING                            │
       │     ○USE NON-RESERVED SEATING WHEN RESERVED SEATING IS FULL
       │     ○USE ONLY NON-RESERVED SEATING                       │
       │     ○USE NON-RESERVED SEATING THAT IS NOT CROWDED (PREDICTION)
       │                                                          │
       │○AUTOMOBILE                                               │
       │  ○TAKE TRAFFIC CONGESTION INTO ACCOUNT                   │
       │                                           ┌────────────┐ │
       │                                           │ROUTE SEARCH│ │
       └───────────────────────────────────────────└────────────┘─┘
                                                          │
                                                         76
```

FIG.4

| PATTERN | R | S | T | U | V |
|---|---|---|---|---|---|
| P0 | | | | | |
| P1 | | | | | |
| P2 | | | | | |
| P3 | ✓ | ✓ | ✓ | | |
| P4 | | ✓ | ✓ | ✓ | ✓ |
| P5 | | | | | |
| P6 | | | ✓ | ✓ | |
| P7 | ✓ | ✓ | ✓ | ✓ | ✓ |

| | B32 | | | | | | | | | | | | | | | | | | | | | | | | | | | | | | B2 | B1 |
|---|---|---|---|---|---|---|---|---|---|---|---|---|---|---|---|---|---|---|---|---|---|---|---|---|---|---|---|---|---|---|---|---|
| A−NS | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 |
| A−S | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 |
| G−NS | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| G−S | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

(prior art)

(prior art)

UNOCCUPIED SEAT ROUTE SEARCH SYSTEM, UNOCCUPIED SEAT ROUTE SEARCH DEVICE, AND TERMINAL DEVICE

TECHNICAL FIELD

The present invention relates to a route search system as a navigation system that uses modes of transportation, i.e., a route search system that uses aircraft, trains, electric trains, buses, or other modes of transportation to search for a route from a departure point to a destination point and provide guidance. The present invention particularly relates to an unoccupied seat route search system, an unoccupied seat route search device, and a terminal device that are capable of efficiently searching and providing guidance in a route (mode of transportation used) to a destination point on the basis of the presence of an unoccupied seat in the mode of transportation used when searching for a route that uses a mode of transportation from a departure point to a destination point.

BACKGROUND ART

There are conventional navigation devices and navigation systems that search map data, road data, and a desired route from a departure point to a destination point, and guide a user. Implementations of such navigation devices and navigation systems include communicating navigation systems and the like in which a mobile telephone or an automobile-mounted navigation device for guiding the driver through a route is used as a navigation terminal that sends a route search request to a route search server, receives the results of the route search request, and receives route guidance.

A communicating navigation system in particular is also used as a navigation system for a walking user. In this system, a mobile telephone or other mobile terminal is used as the navigation terminal. A navigation system used by a walking user is preferably provided with route guidance capability that includes transportation facilities, and there are navigation systems that are capable not only of searching a walking route and providing guidance, but also of storing train timetable data in a route search server and providing guidance in a route (boardable train) from a desired departure station to a desired destination point station, in addition to searching and providing guidance in a walking route.

There are also route search systems in which an airplane, a train, an electric train, a bus, or another mode of transportation is used and a route from a departure point to a destination point is searched and used for guidance. Such a route search system is generally configured to reference a traffic data DB (database) that includes traffic data of transportation facilities in database form on the basis of the departure time, departure point, destination point, arrival time, and other route search conditions specified by a user; to sequentially trace usable modes of transportation as a route that links the departure point to the destination point, including connecting routes; and to present one or a plurality of possible guidance routes (trains and other modes of transportation) that corresponds to the route search conditions. It is generally possible to specify the required time, the number of connections, the fares, and other additional route search conditions.

When the road network used for route searching in a walker navigation system or car navigation system is composed of roads A, B, and C as shown in FIG. 8, for example, the end points, intersection points, turning points, and other points of roads A, B, and C are designated as nodes; roads linking the nodes are indicated by directional links; and the road network data are composed of node data (node latitude/longitude), link data (link numbers), and link costs (distance between links or time required to travel to a link) in the form of data. Specifically, in FIG. 8, the symbols ○ and □ indicate nodes, wherein the □ indicates an intersection of roads. Directional links between nodes are indicated by arrow lines (solid lines, dashed lines, chain double-dashed lines). Links in the upstream and downstream directions of the roads are present, but only links in the direction of the arrows are shown in FIG. 8 to simplify the diagram.

When the data of such a road network is route-searched as a database for route searching, a link connected from the node of the departure point to the node of the destination point is traced, the link cost is stored, and the route having the smallest stored link cost is searched and used for guidance.

Specifically, when a route search is performed using node AX in FIG. 8 as the departure point and node CY as the destination point, the link to node CY is traced in which road A is traveled from node AX, and a right turn into road C is made at the second intersection point, then the link cost is stored and the route having the smallest stored value for the link cost is searched and used for guidance. Other routes from node AX to node CY are not shown in FIG. 8. However, other routes actually exist, and routes whereby it is possible to reach node CY from node AX are therefore searched in the same manner, and the route having the smallest link cost among the searched routes is determined to be the optimum route. This technique is in accordance with the publicly known technique known as Dijkstra's method.

In a road network such as the one shown in schematic fashion in FIG. 8, the link costs are fixed, the stored link cost is an item of uniquely determined static network data when the route is determined, and the amount of data is also proportional to the amount of data in the road network.

In contrast, when the traffic network data of a transportation facility are composed of transportation lines A, B, and C as shown in FIG. 9, for example, train stations (airports in the case of an airplane route) provided to the transportation lines A, B, and C are designated as nodes, intervals linking the nodes are indicated by directional links, and the road network data are composed of node data (node latitude/longitude) and link data (link numbers. In FIG. 9, the symbols ○ and □ indicate nodes, wherein the □ indicates a connection point (train-changing station or the like) between transportation routes, and directional links between nodes are indicated by arrow lines (solid lines, dashed lines, chain double-dashed lines). Links in the upstream and downstream directions of the roads are present, but only links in the direction of the arrows are shown in FIG. 9 to simplify the diagram.

However, the link costs in a traffic network of a transportation facility are fundamentally different from those of a road network. Specifically, the link costs in the road network are fixed and static, whereas the traffic network of the transportation facility has a plurality of trains or aircraft (trains, aircraft, and other routes are referred to hereinafter as modes of transportation) moving through the transportation lines, as shown in FIG. 9. The times of departure from the nodes of each mode of transportation are specific, as are the times of arrival at the subsequent nodes (specified in the timetable data and traffic data). There are also cases in which the routes do not necessarily link to adjacent nodes. This situation occurs in the case of express trains and local trains, for example. In such a case, a plurality of different links exists on the same transportation line, and the time required to travel between nodes may change according to the mode of transportation.

The example of the traffic network of the transportation facility shown in FIG. 9 includes a plurality of transportation modes (routes) Aa through Ac in the same link of a transportation line A, and a plurality of transportation modes (routes) Ca through Cc in a transportation line C. Accordingly, the traffic network of the transportation facility differs from a simple road network; the amount of data relating to nodes, links, and link costs therein is proportional to the sum total of the transportation modes (routes of individual aircraft, trains, and the like); and the amount of network data is extremely large in comparison to the amount of road network data. A correspondingly large amount of time is therefore needed to perform a route search.

All modes of transportation that can be used (ridden) to travel from a departure point to a destination point must be searched, and a transportation mode that satisfies the search conditions must be specified in order to search the route from a certain departure point to a certain destination point using the type of transportation facility traffic network data described above.

For example, in FIG. 9, a route search may be performed so that the departure point is node AX of transportation line A, a certain departure time is specified, and the destination point is node CY of transportation line C. In this case, all the transportation modes subsequent to the departure time among the transportation modes Aa through Ac traveling on transportation line A are selected as sequential departure time routes. Among the transportation modes Ca through Cc traveling on transportation line C, the combination of all transportation modes subsequent to the time at which boarding is possible in a connecting node is searched on the basis of the time of arrival at the connecting node to transportation line C; the time required for each route, the number of transfer connections, and other information is added together; and guidance is provided.

The type of route search described above differs from a route search by the Dijkstra method in a simple road network, the combination of transportation modes (routes of individual aircraft, trains, and the like) becomes extremely large, and the time required for the route search increases, as previously described. An example of such a route search using the data of a transportation facility traffic network is disclosed in Non-patent Document 1 described below (Kikuchi, "Method of searching an optimal connecting sequence for rail/air service on the basis of dynamic network representation, and actual application thereof," *Information Processing Society of Japan*, April 1997, Vol. 38, No. 4, pp. 915-926). The term "dynamic network" refers to a network formed by sequentially adding related nodes and links together with time.

In a search of a route that uses a transportation facility, there may be cases in which a transportation mode (individual aircraft, train, electric train, or bus) is selected that satisfies the search conditions for route guidance, but the specified aircraft, train, electric train, or bus is a transportation mode that operates with reserved seating, all of the reserved seats are booked, and there are no unoccupied seats. In such cases, the aircraft, train, electric train, or bus (transportation mode) is essentially excluded from the guidance route. The presence of unoccupied reserved seats is then added as a search condition, and a reservation system for performing a route search is also furnished as described below. In the present invention, the inclusion of the presence of unoccupied seating as a search condition is referred to as a seating condition, and the seating condition is included in the search conditions when the search conditions are referred to, unless otherwise specified.

Aircraft reservation systems, rail reservation systems, and the like are known as systems that use the presence of unoccupied seating as a condition for searching usable modes of transportation (aircraft or trains) when a mode of transportation is used to travel from a departure point to a destination point. Such a reservation system is generally configured so that a computer device that has a reservation information database and is installed in a reservation center operated by the transportation facilities is accessed to search transportation modes that have unoccupied seats and to make a reservation. The terminal devices are installed in the reservation windows of train stations or travel vendors, but it has recently become possible for the aforementioned computer device to be accessed to make a reservation via the Internet from a user's computer device or mobile telephone.

Such a reservation system differs from a navigation system for searching a plurality of possible transportation modes and providing guidance, and is generally configured so that a search is performed interactively through the intervention of the operator so as to change the search conditions and to present the reservation condition of the next possible option when there are no unoccupied seats in the train that corresponds to the search conditions, the seating condition is not satisfied, and a reservation cannot be made. Reservation systems are also often operated in separate, independent forms for each transportation facility, and a user must either make a reservation with the necessary reservation system separately, or request a search and reservation from an operator using the reservation system of each transportation facility at the window of a travel agency.

The system disclosed in Patent Document 1 (Japanese Patent Application Laid-open No. 4-70963) below, for example, is known as a transportation reservation system that overcomes the inconvenience described above. This transportation reservation system is composed of a transportation information management device for managing the information of all transportation facilities, a scheduling device that uses the transportation information management device to perform scheduling and determine a transportation mode to the destination point through various combinations of various transportation facilities, and a reservation device for making a reservation for the mode of transportation determined by the scheduling device.

In this transportation reservation system, a subsequent transportation facility (route) must be searched again when a reservation cannot be made due to a lack of unoccupied seating in the transportation facility (route) that was searched according to a certain search condition, as described in the lower left column of page 3 of the abovementioned publication: "When there are no unoccupied seats, and a reservation cannot be made (step 107: NO), the transportation facility having the next shortest route is searched by the shortest-route scheduler 11, and scheduling is performed (step 103)."

Patent Document 2 (Japanese Patent Application Laid-open No. 2003-44553) below discloses an itinerary-providing method and an itinerary-providing device. The device is configured so as to be capable of providing detailed travel guidance even when used on a network. Specifically, when the user of a browsing terminal inputs/selects the conditions needed to form an itinerary by using a group of condition setting buttons on a menu screen, and presses a search button, an itinerary formulation request is transmitted to an itinerary service center, and an itinerary formed by the center is displayed in a display area. When the plan shown in the display is changed using a group of modifying buttons or slide buttons, a request to change the plan is transmitted to the center, and an itinerary that is redesigned by the center is displayed in the display area.

In this device, when ticket arrangements or a reservation for reserved seating must be made in order to use the determined travel service, an instruction for confirming the unoccupied seating condition of the travel service (transportation mode) is issued to a schedule search/reservation request unit of the transportation facility via an instruction transmitting/receiving unit. The schedule search/reservation request unit of the transportation facility is then made to access the transportation facility reservation center and confirm the unoccupied seating condition of the travel service. As a result, when it is confirmed that all seats are occupied, a travel service among those that are traveling on the aforementioned route segment, and are scheduled to arrive sooner than the aforementioned scheduled arrival time, are searched to find the travel service having the next closest scheduled arrival time to the aforementioned scheduled arrival time of the travel service for which unoccupied seating could not be confirmed. The travel service thus searched is determined to be embarking in the aforementioned route segment, and the unoccupied seating condition is confirmed in the same manner as described above. This routine is continued until a travel service is found that has unoccupied seating.

A navigation system and a route search method program are disclosed in Patent Document 3 (Japanese Patent Application Laid-open No. 2004-206482) described below. This navigation system has a search condition setting routine device for setting a route search segment as a search condition, a route search routine device for searching a route on the basis of the set search condition, a reserved seating line determination routine device for determining whether the searched route includes at least one or more reserved seating lines, and a notification routine device for notifying an operator of a searched route that includes a reserved seating line when the searched route includes at least one or more reserved seating lines. When the searched route includes at least one or more reserved seating lines, the operator is notified of the searched route that includes a reserved seating line. This navigation system makes it possible to secure a seat for use in a public transportation facility on the searched route.

[Non-Patent Document 1]

Kikuchi, "Method of searching an optimal connecting sequence for rail/air service on the basis of dynamic network representation, and actual application thereof," *Information Processing Society of Japan*, April 1997, Vol. 38, No. 4, pp. 915-926.

[Patent Document 1]

Japanese Patent Application Laid-open No. 4-70963 (FIG. 1)

[Patent Document 2]

Japanese Patent Application Laid-open No. 2003-44553 (FIG. 1, paragraph [0133])

[Patent Document 3]

Japanese Patent Application Laid-open No. 2004-206482

BRIEF DESCRIPTION OF THE DRAWINGS

FIG. 2 is a schematic diagram showing the pattern of the seating condition that is one of the route search conditions;

FIG. 3 is a schematic screen diagram showing the composition of the input screen in the condition input device;

FIG. 4 is a schematic diagram showing the seating condition that is one of the route search conditions;

DISCLOSURE OF THE INVENTION

Figure 1:
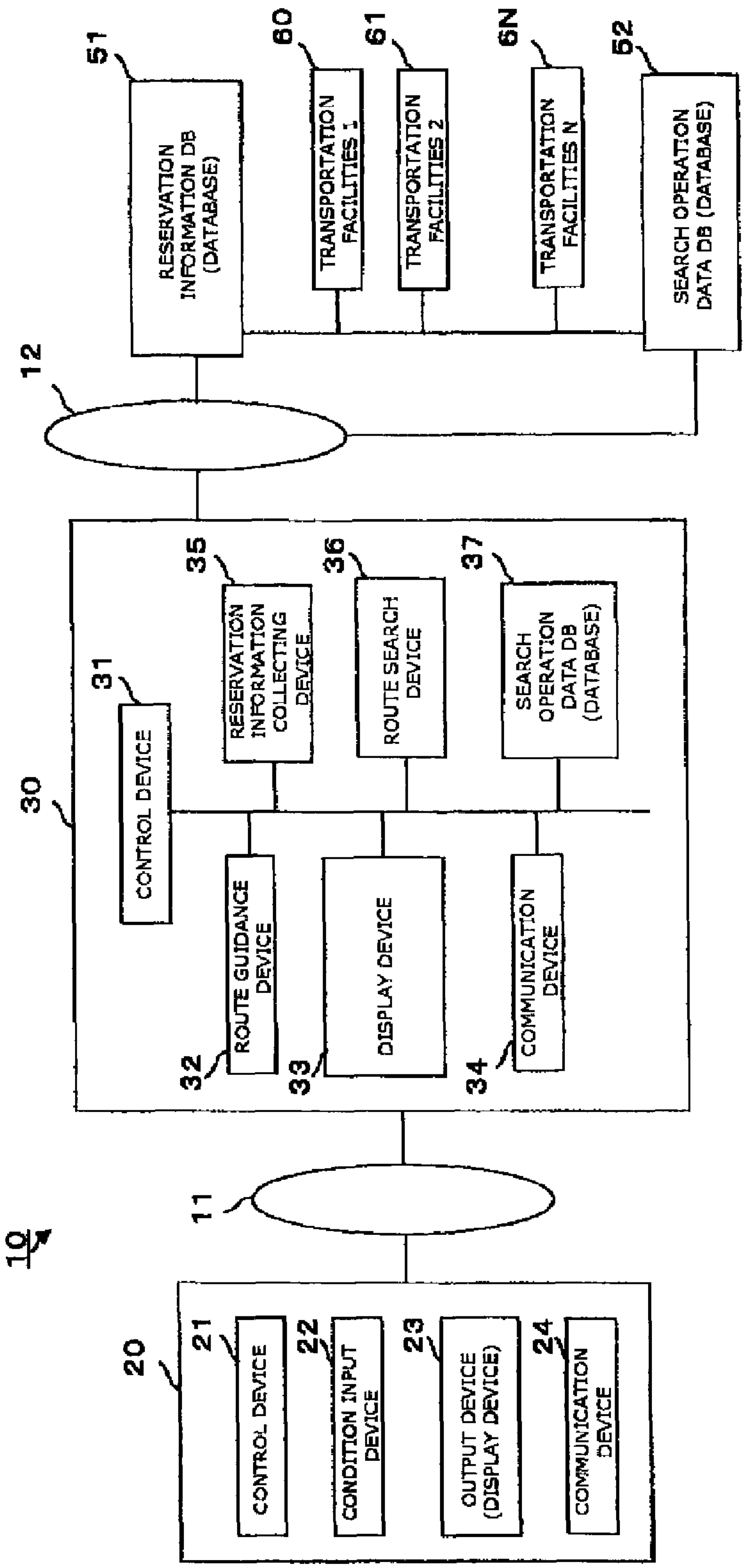
FIG. 1 is a block diagram showing the structure of the unoccupied seat route search system according to Example 1 of the present invention.

Problems To Be Solved By The Invention

There are route search systems for searching and presenting a route from a departure point to a destination point using aircraft, trains, electric trains, buses, and other transportation modes, and particularly systems for searching and presenting a route (utilized transportation facility) to a destination point on the basis of the presence of unoccupied seating in the transportation mode used when searching a route from the departure point to the destination point by using the transportation mode. Such systems are incapable of providing route guidance that is satisfactory to the user merely by searching a guidance route according to whether there are unoccupied seats in the transportation mode (reserved seating in the individual train or aircraft that fits the search conditions) requiring the reservation.

For example, even when there are no unoccupied seats in all the segments of a transportation mode (train, aircraft, or the like) that matches the search conditions from the departure point to the destination point, a non-reserved seat may be used for a certain segment, in which case a reserved seat sometimes becomes available during the trip, and an unoccupied seat may sometimes become available in a segment from the departure point to the destination point even when there is no unoccupied reserved seating. There may also be unoccupied seating in a transportation mode that operates on another line that can be connected to, or on a separate transportation mode on the same line (a transportation mode whose departure time is subsequent to the search condition). The details of such a reservation status can be known by collecting detailed reservation information. The system must be configured so that possible combinations are searched in sequence in the route search to provide a guide route to the user, rather than merely searching for the presence of unoccupied seating in a transportation mode that matches the search conditions.

Particularly when the transportation mode is an aircraft, and the search condition includes the need to depart from a specified departure point at a prescribed time and arrive at a specified destination point by a prescribed time, there are frequent cases in which the departure date or the arrival date must be changed, and the user is forced to change the travel schedule when there are a limited number of services as possible options for the transportation mode, and there are no unoccupied seats in the services. In the case of an aircraft, a long distance is traveled at a high speed, and the ability to perform a comprehensive route search of all service network data could therefore yield a route that corresponds to the search conditions when a different service is boarded at an unplanned connecting stop.

As described above, an extremely large amount of network data and an extremely large number of route combinations are involved in forming a system that is capable not only of ascertaining whether there are unoccupied seats in a route that corresponds to the search conditions, but also of sequentially searching possible combinations and providing a guide route to the user, or to make it possible to perform a comprehensive route search of all service network data when using a transportation mode such as an aircraft that travels a long distance at high speed, The system must therefore be configured so that the desired route can be efficiently searched.

However, in all of the systems disclosed in Patent Documents 1 through 3, when there are no unoccupied seats in the searched transportation mode (train, aircraft, or the like as the guide route), the usual route search is followed by a procedure in which the systems repeat the search (Patent Document 1), search another transportation mode in the same route (Patent Document 2), or exclude the transportation facility having no unoccupied seats from the route search result (Patent Document 3). The systems are also incapable of performing a detailed search of another transportation mode to substitute for the segment in which there are no unoccupied seats, and it is impossible to perform a route search that satisfies the requirements of the user.

The abovementioned also have drawbacks in being unable to perform a route search efficiently while reducing the time required for the route search.

Specifically, in a system such as the one described in Patent Documents 1 through 3, a route search is performed again when all of the reserved seating is occupied in the optimum searched transportation mode (route), and the route search must be started over to find a second route, a third route, and the like. The amount of processing involved in the route search therefore increases exponentially when an unoccupied seat is not found. Because searches that give priority to fares or a short route are particularly common, similar transportation modes (routes) tend to be consistently outputted, and a transportation mode (route) to be provided for guidance may be rather difficult to find when certain common transportation modes (trains or aircraft) included in the transportation line are fully occupied. When a connection must be made, a guide route is not obtained if even a single service is fully occupied. In the method in which a route search is performed first, the search is ultimately futile, and the load on the route search server is increased, The conventional technique also focused solely on reserved seating, and there was no detailed setting capability that would allow non-reserved seating to be included in the guide route when available.

As a result of varied and concentrated investigation aimed at overcoming the abovementioned drawbacks, the inventors collected reservation information about various transportation facilities and dynamically formed service network data used to perform a route search on the basis of the reservation information and a route search condition that is specified by a user. Specifically, the inventors developed the present invention upon discovering that the time required to perform a route search can be reduced every time a route search is performed, by excluding service data relating to transportation modes (routes) that do not correspond to the route search conditions that include reservation information and seating conditions; acquiring only service data relating to transportation modes that match the route search conditions that include the seating condition; and performing a route search after dynamically forming service network data for use in the route search.

Specifically, an object of the present invention is to overcome the aforementioned drawbacks and to provide an unoccupied seat route search system, an unoccupied seat route search device, and a terminal device that are capable of efficiently searching and providing guidance in a route (mode of transportation used) to a destination point on the basis of the presence of an unoccupied seat in the mode of transportation used when a route from a departure point to a destination point is searched using a mode of transportation.

Means for Solving the Above-mentioned Problems

The invention according to a first aspect for overcoming the aforementioned drawbacks provides an unoccupied seat route search system for searching for and guiding in a route using a transportation mode from a departure point to a destination point on the basis of an inputted route search condition, wherein the unoccupied seat route search system is characterized in comprising a operation data database for storing service data of transportation modes; a search operation data database for storing operation data for search; a reservation information collection device for collecting reservation information about the transportation modes; a condition input device for inputting route search conditions that include a seating condition; a route search device for referencing the database used for searching, and searching for a transportation mode constituting a route on the basis of a route search condition and reservation information that is collected by the reservation information collecting device; and an output device for outputting a result of the route search, wherein the route search device extracts a transportation mode having reservation information that matches a route search condition from the database of service data prior to a route search, forms a database of service data used for searching, and performs a route search.

The invention according to a second aspect provides the unoccupied seat route search system according to the first aspect, characterized in that the condition input device has a device for inputting a seating condition according to which all transportation modes are unoccupied and available for reservation.

The invention according to a third aspect provides the unoccupied seat route search system according to the first aspect, characterized in that the condition input device has a device whereby availability of unoccupied seats is inputted as a seating condition in cases in which the transportation mode is available for reservation.

The invention according to a fourth aspect provides the unoccupied seat route search system according to the first aspect, characterized in that the condition input device has a device for inputting a seating condition according to which a transportation mode is designated as a route when the transportation mode has non-reserved seating, even when the transportation mode is fully occupied and unavailable for reservation.

The invention according to a fifth aspect provides the unoccupied seat route search system according to the first aspect, characterized in that the condition input device has a device for inputting a seating condition according to which a transportation mode can be utilized without a reservation.

The invention according to a sixth aspect provides the unoccupied seat route search system according to the first aspect, characterized in that the condition input device has a device for inputting a seating condition according to which the non-reserved seating is designated as a route when the transportation mode has non-reserved seating, even when the transportation mode is available for reservation and has unoccupied seating.

The invention according to a seventh aspect provides an unoccupied seat route search device for referencing service data from a operation data database in which service data are stored, and searching a route using a transportation mode from a departure point to a destination point on the basis of a route search condition that includes a seating condition, wherein the unoccupied seat route search device is characterized in comprising a search operation data database for storing operation data for search; a reservation information collection device for collecting reservation information about the transportation modes; a condition input device for inputting route search conditions that include a seating condition; a route search device for referencing the operation data database used for searching, and searching for a transportation mode constituting a route on the basis of a route search condition and reservation information that is collected by the reservation information collecting device; and an output device for outputting a result of the route search, wherein the route search device extracts a transportation mode having reservation information that matches a route search condition from the database of service data prior to a route search, forms a database of service data used for searching, and performs a route search.

The invention according to an eighth aspect provides the unoccupied seat route search device according to the seventh aspect, characterized in inputting a search condition that includes a seating condition according to which all transportation modes are unoccupied and available for reservation.

The invention according to a ninth aspect provides the unoccupied seat route search device according to the seventh aspect, characterized in inputting a search condition that includes a seating condition according to which a transportation mode is unoccupied when the transportation mode is available for reservation.

The invention according to a tenth aspect provides the unoccupied seat route search device according to the seventh aspect, characterized in inputting a search condition that includes a seating condition according to which a transportation mode is designated as a route when the transportation mode has non-reserved seating, even when the transportation mode is fully occupied and unavailable for reservation.

The invention according to an eleventh aspect provides the unoccupied seat route search device according to the seventh aspect, characterized in inputting a search condition that includes a seating condition according to which a transportation mode can be utilized without a reservation.

The invention according to a twelfth aspect provides the unoccupied seat route search device according to the seventh aspect, characterized in inputting a search condition that includes a seating condition according to which the non-reserved seating is designated as a route when the transportation mode has non-reserved seating, even when the transportation mode is available for reservation and has unoccupied seating.

The invention according to a thirteenth aspect provides a terminal device comprising a search operation data database for storing operation data for search; a reservation information collection device for collecting reservation information about the transportation modes; and a route search device for referencing the operation data database used for searching, and searching for a transportation mode constituting a route on the basis of a route search condition and reservation information that is collected by the reservation information collecting device, wherein the route search device, prior to a route search, transmits a search condition to an unoccupied seat route search device in which the route search device extracts a transportation mode having reservation information that matches a route search condition from the database of service data, forms a database of service data used for searching, and performs a route search; the terminal device characterized in comprising an inputting device for inputting a route search condition that includes a seating condition.

The invention according to a fourteenth aspect provides the terminal device according to the thirteenth aspect, characterized in that the condition input device has a device whereby the fact that all transportation modes are unoccupied and available for reservation is inputted as a seating condition.

The invention according to a fifteenth aspect provides the terminal device according to the thirteenth aspect, characterized in that the condition input device has a device whereby availability of unoccupied seats is inputted as a seating condition in cases in which the transportation mode is available for reservation.

The invention according to a sixteenth aspect provides the terminal device according to the thirteenth aspect, characterized in that the condition input device has a device for inputting a seating condition according to which a transportation mode is designated as a route when the transportation mode has non-reserved seating, even when the transportation mode is fully occupied and unavailable for reservation.

The invention according to a seventeenth aspect provides the terminal device according to the thirteenth aspect, characterized in that the condition input device has a device for inputting a seating condition according to which a transportation mode can be utilized without a reservation.

The invention according to an eighteenth aspect provides the terminal device according to the thirteenth aspect, characterized in that the condition input device has a device for inputting a seating condition according to which the non-reserved seating is designated as a route when the transportation mode has non-reserved seating, even when the transportation mode is available for reservation and has unoccupied seating.

EFFECT OF THE INVENTION

The invention according to the first aspect provides a unoccupied seat route search system that comprises a route search device for referencing the operation data database used for searching, and searching for a transportation mode constituting a route on the basis of a route search condition and reservation information that is collected by the reservation information collecting device; and an output device for outputting a result of the route search. The route search device also extracts a transportation mode having reservation information that matches a route search condition from the database of service data prior to a route search, forms a database of service data used for searching, and performs a route search. Accordingly, there is no need to target all of the network data of the service network for the route search, and it is possible to efficiently search for a route.

The inventions according to the second through sixth aspects provide the unoccupied seat route search system according to the first aspect, wherein the condition input device has a device for inputting various seating conditions used to input a route search condition that is coupled with the seating reservation information about the transportation mode. Accordingly, it is possible for the user to input a detailed seating condition by using the condition input device, and for the route search device to search for a route (transportation mode) that matches the input condition.

The invention according to the seventh aspect provides a unoccupied seat route search device that comprises a route search device for referencing the operation data database used for searching, and searching for a transportation mode constituting a route on the basis of a route search condition and reservation information that is collected by the reservation information collecting device; and an output device for outputting a result of the route search. The route search device also extracts a transportation mode having reservation information that matches a route search condition from the database of service data prior to a route search, forms a database of service data used for searching, and performs a route search. Accordingly, there is no need to target all of the network data of the service network for the route search, and it is possible to efficiently search for a route.

The inventions according to the eighth through twelfth aspects provide the unoccupied seat route search device according to the seventh aspect, wherein the condition input device has a device for inputting various seating conditions used to input a route search condition that is coupled with the seating reservation information about the transportation mode. Accordingly, it is possible for the user to input a detailed seating condition by using the condition input device, and for the route search device to search for a route (transportation mode) that matches the input condition.

The invention according to the thirteenth aspect provides a terminal device for transmitting a search condition to an unoccupied seat route search device that extracts a transportation mode having reservation information that matches a route search condition from the database of service data prior to a route search, forms a database of service data used for searching, and performs a route search; and the terminal device comprises an inputting device for inputting a route search condition that includes a seating condition. Accordingly, it is possible for a user to transmit conditions of the route search that include a seating condition to the unoccupied seat route search device, and efficiently obtain the results of the route search.

The inventions according to the fourteenth through eighteenth aspects provide the unoccupied seat route search device according to the thirteenth aspect, wherein the condition input device has a device for inputting various seating conditions used to input a route search condition that is coupled with the seating reservation information about the transportation mode. Accordingly, it is possible for the user to input a detailed seating condition by using the condition input device, and for the route search device to search for a route (transportation mode) that matches the input condition.

BEST MODE FOR CARRYING OUT THE INVENTION

Figure 4:
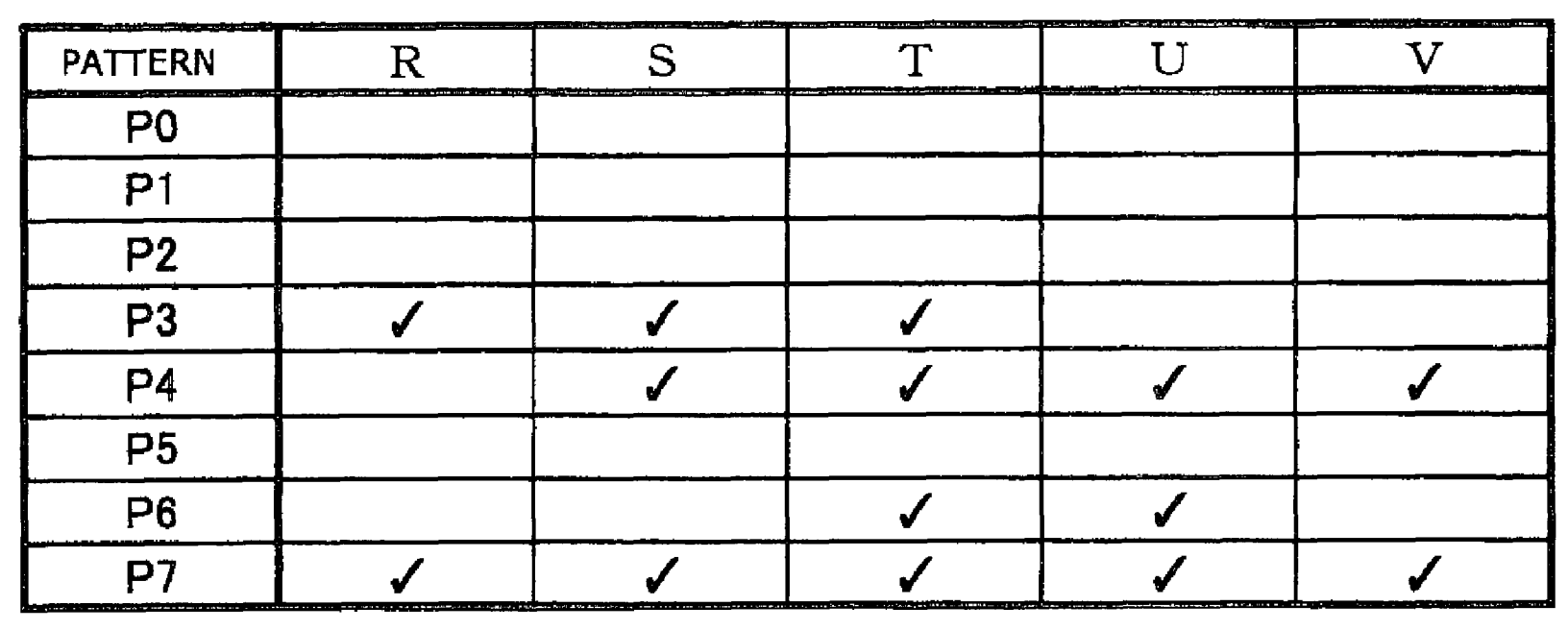
Figure 5:
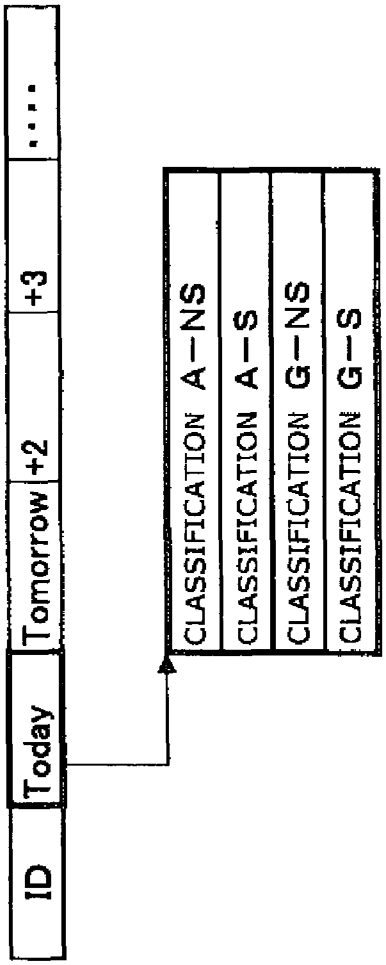
FIG. 5 is a schematic diagram showing the data structure in the reservation information DB.
Figure 6:
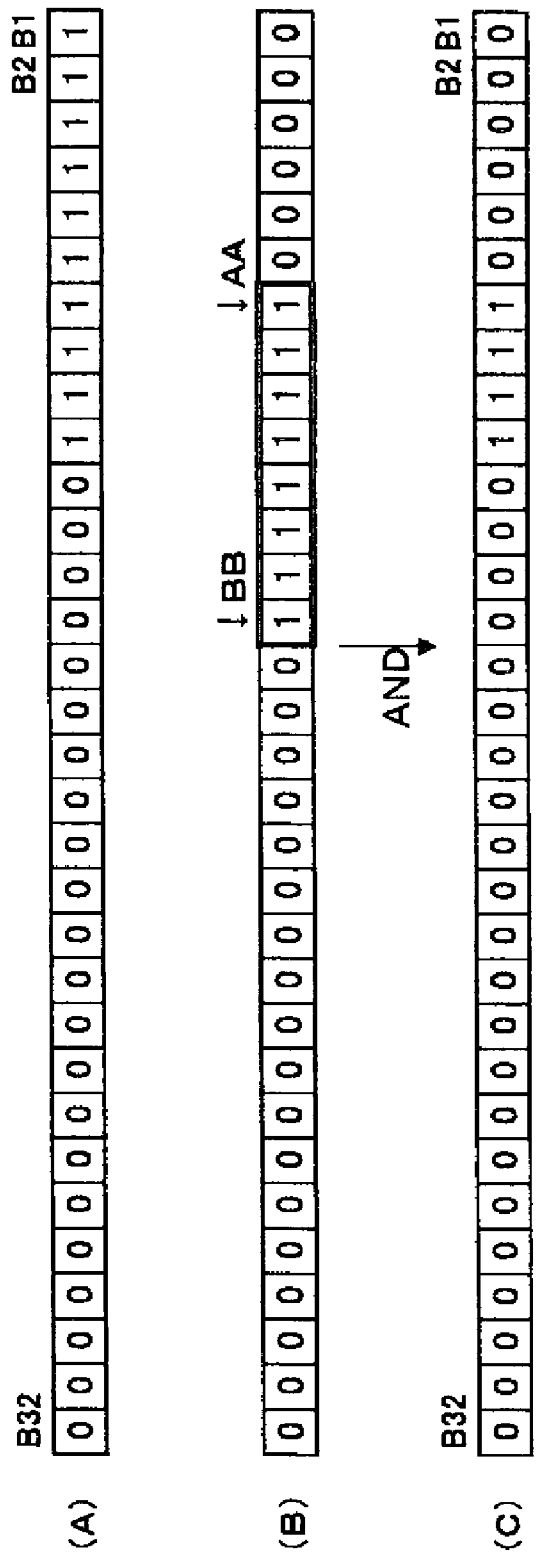
FIG. 6 is a schematic diagram showing the routine for using the reservation information stored in the reservation information DB to extract the transportation mode that matches the seating condition.
Figure 7:
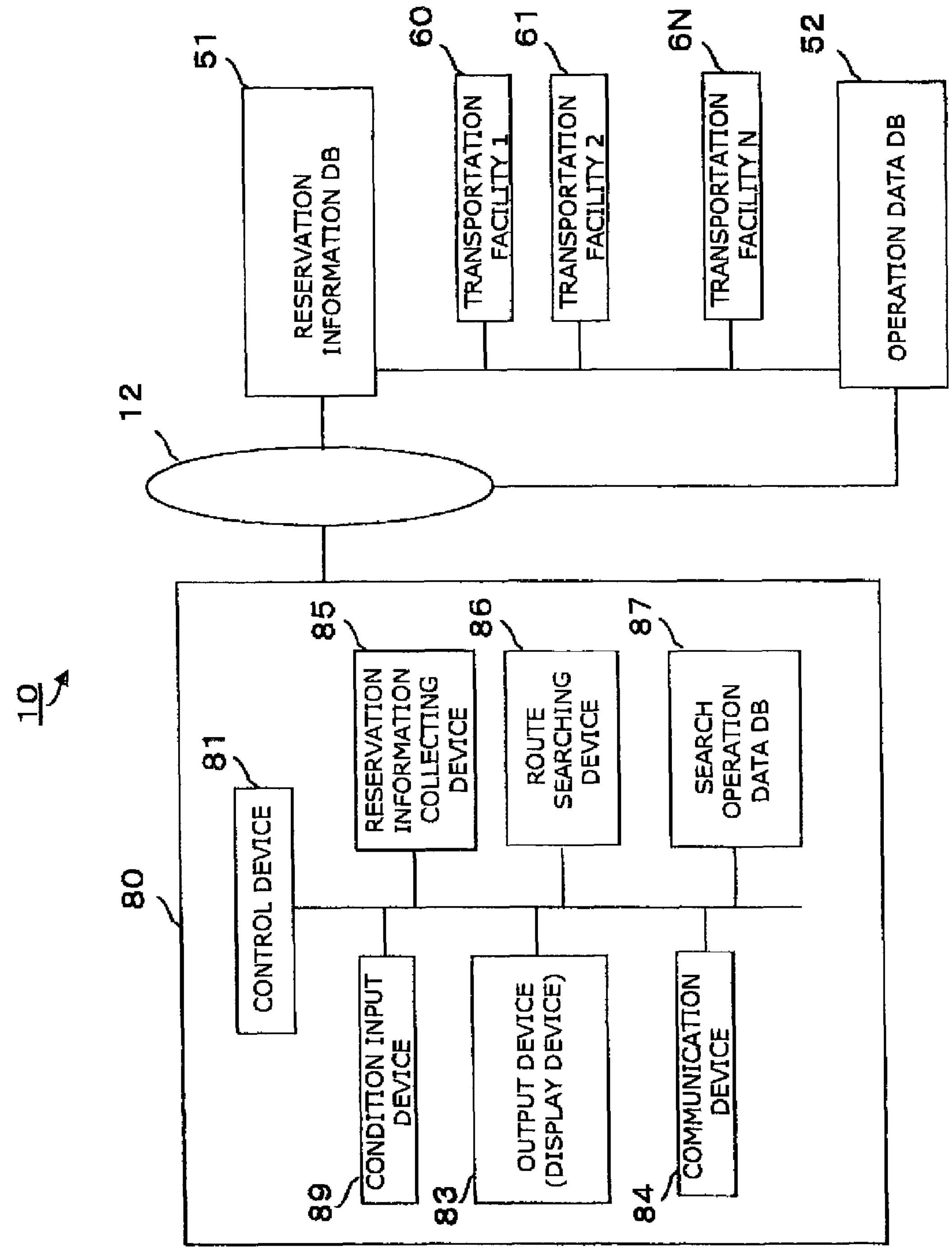
FIG. 7 is a block diagram showing the structure of the unoccupied seat route search system according to Example 2 of the present invention.
Figure 8:
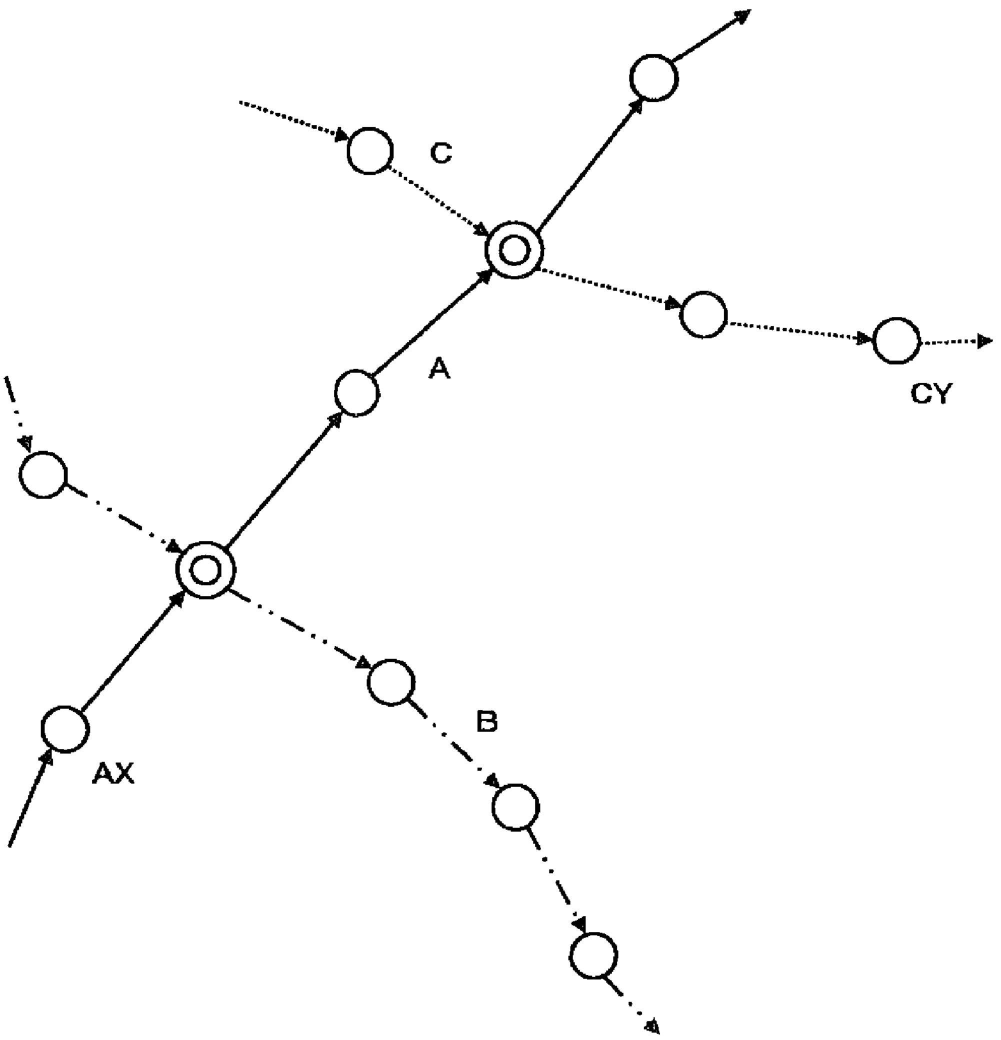
FIG. 8 is a schematic diagram showing the road network used to perform a common route search.
Figure 9:
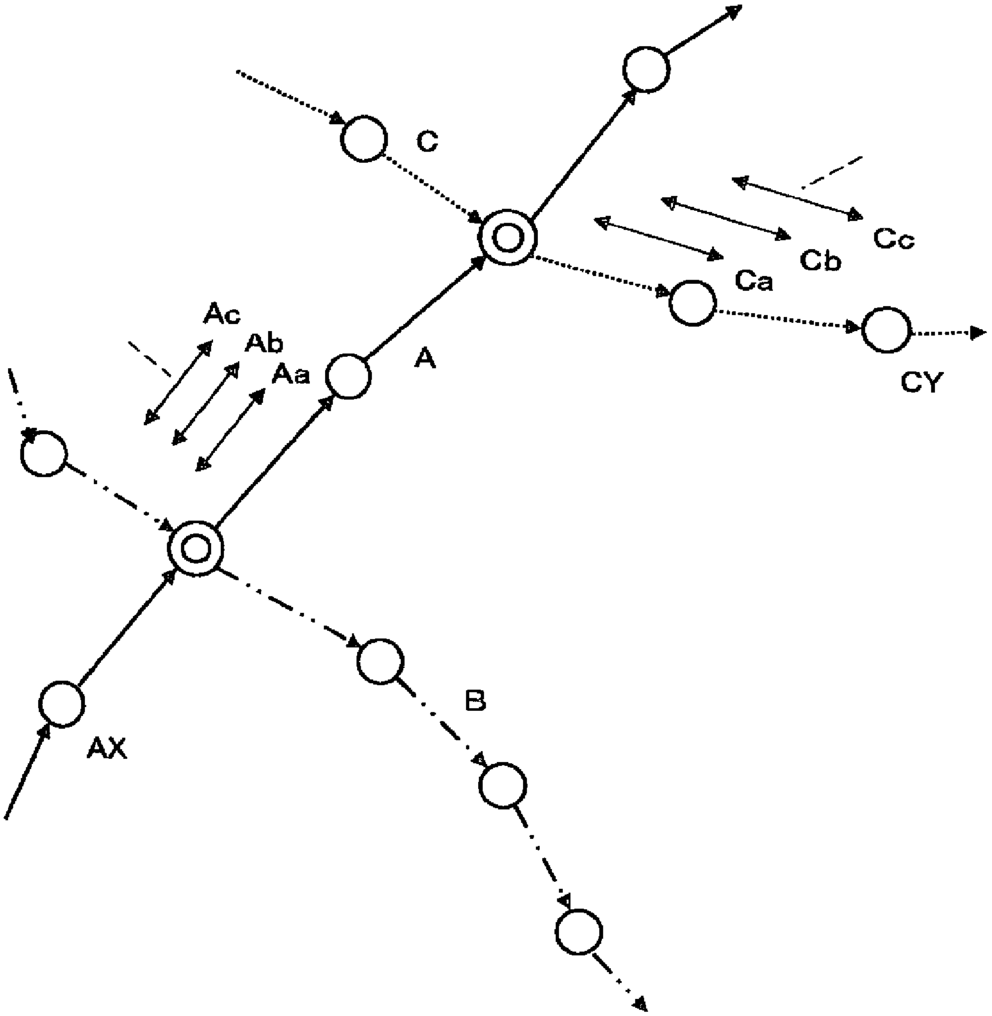
FIG. 9 is a schematic diagram showing the road network used to search for a route that uses a transportation facility.

Embodiments of the present invention will be described in detail hereinafter using examples and drawings. FIG. 1 is a block diagram showing the structure of the unoccupied seat route search system according to Example 1 of the present invention. FIG. 2 is a schematic diagram showing the pattern of the seating condition that is one of the route search conditions. FIG. 3 is a schematic screen diagram showing the composition of the input screen in the condition input device. FIG. 4 is a schematic diagram showing the seating condition that is one of the route search conditions. FIG. 5 is a schematic diagram showing the data structure in the reservation information DB. FIG. 6 is a schematic diagram showing the routine for using the reservation information stored in the reservation information DB to extract the transportation mode that matches the seating condition. FIG. 7 is a block diagram showing the structure of the unoccupied seat route search system according to Example 2 of the present invention.

EXAMPLE 1

The unoccupied seat route search system 10 according to Example 1 of the present invention is composed of a terminal device 20 for communicating via the Internet or other networks 11, 12; an unoccupied seat route search device 30; a operation data DB (database) 52 that stores service data of transportation modes operated by various transportation facilities 60 through 6N; and a reservation information DB (database) 51.

The terminal device 20 is composed of a control device 21, a condition input device 22, an output device 23, a communication device 24, and other components. The control device 21 is a microprocessor having RAM, ROM, and a processor (not shown), and controls the operation of each component according to a control program that is stored in the ROM. The condition input device 22 is an input device composed of number keys, letter keys, other function keys, selection keys, and other components. The condition input device 22 selects the desired menu from a menu screen displayed by the display device that is the output device 23, or inputs a condition for a route search through operation of the number keys or letter keys. The communication device 24 is an interface for communicating with the unoccupied seat route search device 30 via the network 11.

Besides the departure point, destination point, departure time, arrival time, and other common conditions for a route search, the route search conditions that can be inputted in the present example include the presence of reserved seating, and variation in the status of unoccupied seats in the travel mode (individual train or aircraft) constituting the route. These conditions will be referred to hereinafter as the "seating condition." The details of the seating condition will be described hereinafter.

The unoccupied seat route search device 30 is composed of a control device 31, a route guidance device 32, a display device 33, a communication device 34, a reservation information collecting device 35, a route searching device 36, and a search operation data DB 37. The control device 31 is a microprocessor having RAM, ROM, and a processor (not shown), and controls the operation of each component according to a control program that is stored in the ROM. The display device 33 is the monitor display device of the unoccupied seat route search device 30, and the communication device 34 is an interface for communicating with the terminal device 20, the reservation information DB 51, or the operation data DB 52 via the networks 11, 12. With the route guidance device 32, the guide route modes (individual trains, aircraft, or other transportation modes) searched by the route searching device 36 are compiled into data for delivery to the terminal device 20.

For each transportation mode (train or aircraft) operated by the transportation facilities 60 through 6N, the reservation information DB 51 updates and stores reservation information, i.e., information indicating whether unoccupied reserved seating is available or whether the reserved seating is fully occupied by reservations; and delivers the reservation information via the Internet from a computer device (not shown) having the reservation information DB 51 to the reservation center of a travel vendor or the reservation window terminals of the transportation facilities, or, in the present example, to the unoccupied seat route search device 30, the PC of an individual or other entity who is an end user, a mobile telephone, or the like.

In the same manner, the operation data DB 52 is a database that stores service network data of each transportation mode (train or aircraft) operated by the transportation facilities 60 through 6N, and stores service network data created from the timetables of each transportation mode operated by the transportation facilities 60 through 6N. The operation data DB 52 also includes seating data and other static data relating to the presence of reserved seating or non-reserved seating; regular cars, first-class cars, private cabins, sleeping cars, and other grades; and the presence of nonsmoking seats and smoking seats in each transportation mode operated by the transportation facilities 60 through 6N. Service data and seating data can also be provided for the route search from a computer device (not shown) having the operation data DB 52 to the reservation center of a travel vendor, the reservation window terminals of the transportation facilities, or the unoccupied seat route search device 30 of the present example.

The route searching device 36 is a multi-modal route search engine that is capable of searching a route that uses walking transportation facilities simultaneously, and such a route search engine is disclosed in Japanese Patent Application Laid-open No. 2000-258184 (U.S. Pat. No. 6,349,261), for example. The reservation information DB 51 is collected via the reservation information collecting device 35 on the basis of the route search condition that includes the seating condition inputted from terminal device 20. The service data alone that matches the route search condition that includes the seating condition are extracted from the operation data DB 52 in the manner described hereinafter, service data (service network) used for searching are dynamically formed in the search operation data DB 37, and the service database for searching is used to search for the transportation mode that matches the aforementioned route search condition that includes the seating condition.

Rather than simply excluding a transportation mode from the route search when the transportation mode is found to be fully occupied, a configuration is adopted in the present example that makes it possible to perform a route search using a seating condition that includes the three factors of "whether there is non-reserved seating in the transportation mode to be searched," "whether there is reserved seating," and "reservation information when there is reserved seating (whether seating is fully occupied or includes an unoccupied seat)"; and the route search can be performed according to the particular wishes of the user. Eight conditions in which the abovementioned three conditions are mechanically combined are classified into the types of pattern shown in FIG. 2, and have the meanings described below. Specifically, a "0" in the columns of FIG. 2 means "absent," and a "1" means "present."

P0: neither non-reserved seating nor reserved seating is present; corresponds to a non-service day P1: since there cannot be unoccupied seats when there is no reserved seating, this pattern is outside the route search conditions P2: reserved seating in all cars, full occupancy P3: reserved seating in all cars, unoccupied seats present P4: non-reserved seating in all cars P5: since there cannot be unoccupied seats when there is no reserved seating, this pattern is outside the route search conditions P6: reserved seating at full occupancy; non-reserved seating present P7: unoccupied seats present in reserved seating; non-reserved seating also present The condition input device 22 of the terminal device 20 can input the six seating conditions other than conditions P1 and P5. FIG. 3 is a schematic screen diagram showing the composition of the condition input screen 70 that constitutes the condition input device 22 in the terminal device 20. The user inputs the route search conditions from the terminal device 20 using the input screen shown in FIG. 3. For example, a check box for the input categories of address, post (postal code), telephone (telephone number), train station/airport, and spot are checked and inputted to the corresponding input boxes 71 through 73 when the destination point, connection points, and destination point are inputted to the input boxes 71 through 73. A configuration may also be adopted in which a pull-down menu is prepared in advance in each input box 71 through 73, and a list selection screen of pre-set departure points, connection points, and destination points is displayed when an input category is checked, and desired locations can be selectively inputted. The departure time and arrival time are also inputted in the same manner, i.e., the input category check boxes for departure and arrival are checked, and the departure time and arrival time are numerically entered into the input box 74.

The seating condition or the travel mode used can be inputted in the search conditions by checking the corresponding check box 75 shown in the drawing. For example, when a route search that takes traffic congestion into account is specified in the case of travel by automobile, a check may be entered into the corresponding check box, and the route search button 76 may be clicked. When the state of traffic congestion is not taken into account, only the automobile check box is checked, and the route search button 76 is clicked. When the transportation facility of the present example is used for travel, the "vehicle+walking" check button is checked, and the check boxes for desired options are checked from the grade option and smoking option. When the route search condition is a seating condition that includes an unoccupied seat reservation in the transportation mode (aircraft or train) constituting the route, route search conditions that include the seating condition can be inputted by checking the "reservation options" check box, checking any of the five check boxes below the "select reservation" check box to specify the search conditions, and clicking the route search button 76.

The route search conditions inputted in the terminal device 20 in the manner described above are received by the unoccupied seat route search device 30 via the communication device 24 and the communication device 34, and the route searching device 36 performs a route search. The route searches for walking and automobile travel among the travel modes specified by the condition input device 22 are the same as those performed in a common navigation system, and are therefore not described. The present example described hereinafter is of a route search of a segment in which a transportation facility is used as the travel mode.

In FIG. 3, check boxes that allow selection of the following five seating conditions are disposed below "reservation options." The reservation options in order from top to bottom are "always use reserved seating," "use all reserved seating," "use non-reserved seating when reserved seating is full," "use only non-reserved seating," and "use non-crowded non-reserved seating (predict)."

The option "always use reserved seating" is a seating condition in which reserved seating is present and an unoccupied seat is present, and corresponds to patterns P3 and P7 of FIG. 2 (abbreviated as "all reserved").

The option "use all reserved seating" is a seating condition in which reserved seating is used when there is reserved seating and an unoccupied seat, and non-reserved seating is used when there is only non-reserved seating. This option corresponds to patterns P3, P4, and P7 of FIG. 2 (abbreviated as "reservation priority").

The option "use non-reserved seating when reserved seating is full" is a realistic seating condition in which non-reserved seating is adequate when reserved seating is full. This option corresponds to patterns P3, P4, P6, and P7 of FIG. 2 (abbreviated as "non-reserved seating allowed"). This seating condition has the widest range of allowance, but pattern P2 of FIG. 2 (the case in which all seating of the transportation mode is reserved seating, and there is no unoccupied seat) cannot be designated as the route.

It may appear at first that the option "use only non-reserved seating" contradicts an unoccupied seat route search (reservation), but this option is also a seating condition that makes it possible to find a route that allows the destination point to be reached without a reservation. When the need to travel to a destination point is not determined and a reservation cannot be made, the aforementioned option can be used to determine the time by which the departure must be made if it should happen that a reservation cannot be obtained. This seating condition corresponds to patterns P4, P6, and P7 of FIG. 2 (abbreviated as "all open").

The option "use non-crowded non-reserved seating (predict)" is a seating condition that includes the use of non-reserved seating of trains whose reserved seating is not full, and trains having only non-reserved seating. In this seating condition, since the non-reserved seating is also expected to be crowded when the reserved seating is full, the estimate is instead that the non-reserved seating is not crowded in trains in which the reserved seating is not full. It is impossible to predict from the reservation status how crowded a train is that has only non-reserved seating, but a train having only non-reserved seating inherently tends to be operated as such due to a level of availability that does not require reserved seating, and trains having only non-reserved seating are therefore included in the seating condition. This seating condition corresponds to P4 and P7 in FIG. 2 (abbreviated as "unoccupied-seat prediction").

The seating conditions are organized in FIG. 4. Columns R through V in FIG. 4 indicate the five seating conditions described previously. Column R indicates the seating condition of "all reserved," column S indicates "reservation priority," column T indicates "non-reserved seating allowed," column U indicates "all open," and column V indicates "unoccupied-seat prediction." Transportation modes that match patterns having a check (check mark) in the columns are to be searched as routes. For example, the "all reserved" seating condition indicates the need to extract a transportation mode whose reservation status satisfies patterns P3 and P7 of FIG. 2, i.e., a transportation mode that has both reserved seating and an unoccupied seat, and also satisfies a route search condition other than the seating condition.

When route search conditions that include one of the abovementioned five seating conditions are inputted in the terminal device 20, the inputted route search conditions are transmitted to the unoccupied seat route search device 30. When the unoccupied seat route search device 30 receives the route search conditions, the route searching device 36 references the reservation information DB 51 and the operation data DB 52, and excludes transportation modes that do not satisfy the route search conditions that include the seating condition. Specifically, the route searching device 36 extracts the service data from the operation data DB 52 for transportation modes that satisfy the route search conditions including the seating condition, and performs a route search after forming service network data based on the service data in the search operation data DB 37.

For example, when the option "always use reserved seating" (abbreviated as "all reserved") is specified as the seating condition, the condition is one in which the transportation mode designated as the route has reserved seating and an unoccupied seat in the reserved seating, and the unoccupied seat can be reserved. The route searching device 36 references the reservation information DB 51 and the operation data DB 52 so that a transportation mode that does not match the condition is not extracted as the route. Only those transportation modes that match the route search conditions are extracted to the exclusion of transportation modes that have no reserved seating and transportation modes that have reserved seating but no unoccupied seats, the service network data are formed in the search operation data DB 37, and a route search is performed. Local lines and other transportation modes that have no reserved seating are therefore excluded. Routes to transportation facilities that have reserved seating are assigned to walking or automobile (taxi) travel. Alternatively, in an airline in which the departure point and destination point are airports, the seating condition is one in which an unoccupied seat is selected as the route when an unoccupied seat is available.

To summarize the above description, a route search is performed by the route searching device 36 in the following manner. Specifically, when the departure point and the destination point are arbitrary locations instead of train stations, airports, or other terminals, several possible departure stations where a transportation facility can be boarded from the departure point, as well as several possible destination point stations near the destination point, are searched in the same manner as in a common walking navigation system; and the shortest routes from the departure point to the possible stations, as well as the shortest routes from the possible destination point station to the destination point, are each searched as guide routes. The route searching device 36 then references the reservation information DB 51 and the operation data DB 52, extracts the service data of transportation modes that match the route search conditions, forms dynamic service network data from the departure possible stations to the destination point possible stations in the search operation data DB 37 on the basis of the extracted service data, and searches a plurality of possible routes (possible transportation modes).

The service data (sometimes referred to generally as service schedules) of the transportation modes targeted for the route search are first extracted from the operation data DB 52 in the stage in which the dynamic service network data are formed. Only the data of transportation modes that match the route search conditions including the seating condition are extracted in the extraction stage of the present example. In the aforementioned "all reserved" seating condition, for example, only the transportation modes of patterns P3 and P7 in FIG. 4 are extracted. Since only the presence of non-reserved and reserved seating, as well as other information for the transportation modes is stored in the operation data DB 52, information as to the presence of unoccupied seating is acquired from the reservation information DB 51. The technique described in Non-patent Document 1 above is used to form the service network data in the search operation data DB and to perform a route search by using the service network data.

The reservation information DB 51 will next be described in detail. As previously mentioned, the reservation information DB 51 constantly updates the reservation status of the transportation modes (trains, aircraft, and the like) operated by the transportation facilities 60 through 6N. In the case of a train, for example, the reservation information DB 51 has the type of data structure shown in FIG. 5, wherein the train ID is indicated first, after which the reservation status data of all periods that can be reserved after the current day (Today) are sequentially updated and stored. The reservation status data are divided into seat classifications for each train, and the four groups of reservation status data are stored that include "classification A-NS," "classification A-S," "classification G-NS," and "classification G-S." In the stored reservation status data, "classification A-NS" refers to reserved non-smoking seating of a regular train car; "classification A-S" refers to reserved smoking seating of a regular train car; "classification G-NS" refers to reserved non-smoking seating of a first-class car; and "classification G-S" refers to reserved smoking seating of a first-class car.

Each seat classification "A-NS," "A-S," "G-NS," and "G-S" is stored in 32 bits of reservation status data B1 to B32. Bit B1 stores the presence of a reservation in the station of origin, and the presence of reservations in the sequence of station stops is stored in bits B2 through B32. The reservation status is stored in each bit as a "1" or a "0." A "1" indicates a state of full occupancy in which there are no unoccupied seats, and a "0" indicates a state of incomplete occupancy in which there are unoccupied seats.

Specifically, the reservation status data of a single seating classification are composed of 32 bits of data as described above, wherein the initial bit (LSB) indicates the reservation status in the station of origin, i.e., whether full occupancy has been reached. Full occupancy is indicated by "1." The reservation state of the next station stop is stored in the next bit. Since the data length is 32 bits, it is possible to store the reservation states of 32 stations including the station of origin. This data length is adequate for Japan, for instance. When there are more station stops, the data length may be 64 bits, 128 bits, or another appropriate length. When there are a small number of station stops, a "0" may be stored in the unnecessary bits. The number of connection points is not so large in the case of an aircraft, and a data length of 16 bits or 8 bits is therefore adequate.

The schematic diagram shown in FIG. 6 will be used to describe the processing performed when a transportation mode that matches the seating condition is extracted using the reservation information that is stored in the reservation information DB 51 in the type of data structure described above. Riding segment data (B) are created for the reservation status data (A) of the train that corresponds to the boarding date as a route search condition, and the two sets of data are subjected to an AND operation. At this time, when the seating condition of the route search conditions is the reserved smoking seating of a regular train car, the corresponding classification of reservation status data (see FIG. 5) is selected in the reservation status data (A).

The riding segment in the riding segment data (B) is data in which a "1" is stored for the segment that corresponds to the station that is one stop short of the exit station from the origin station (full occupancy ahead of the exit station is irrelevant), and is created based on the route search conditions (origin station and exit station). When the data (C) resulting from subjecting the aforementioned data to an AND operation are "0," the riding segment does not have full occupancy. When the result is not "0," this means that a "1", is stored in one of the bits, and a fully occupied segment exists in the riding segment.

The operation data DB 52 and the reservation information DB 51 are referenced, and the route searching device 36 performs the processing described above to extract only the transportation modes (individual trains, aircraft, and the like) that match the route search conditions that include the seating condition, dynamically forms the service network data for searching in the search operation data DB 37, and performs a route search that includes connections. Therefore, it is possible to search for the desired route efficiently and in a short time relative to the case in which the entire service network is targeted for the route search.

The reservation status of each transportation facility 60 through 6N is preferably reflected in real time in the reservation information DB 51, but since the reservation often varies between the sale date of the ticket and the period of about two days prior to the boarding date, the reservation status that corresponds to the period is preferably collected at particularly short intervals and reflected in the database. The operation data DB 52 and the reservation information DB 51 may also reside on the same server as the unoccupied seat route search device 30, or in adjacent servers.

EXAMPLE 2

FIG. 7 is a block diagram showing the structure of the unoccupied seat route search system according to Example 2 of the present invention. The same reference symbols are used in FIG. 7 to indicate constituent elements that are the same as those of Example 1 shown in FIG. 1. The structure of Example 2 differs from that of Example 1 in that the terminal device 20 and unoccupied seat route search device 30 in Example 1 are an integrated component in the unoccupied seat route search device 80. The unoccupied seat route search device 80 in Example 2 is composed of a control device 81, a condition input device 89, a display device 83, a communication device 84, a reservation information collecting device 85, a route searching device 86, and a search operation data DB 87. The control device 81, display device 83, communication device 84, reservation information collecting device 85, route searching device 86, and search operation data DB 87 have the same functions as the control device 31, display device 33, communication device 34, reservation information collecting device 35, route searching device 36, and search operation data DB 37 in Example 1, respectively. The condition input device 89 in Example 2 also has the same function as the condition input device 22 of the terminal device 20 in Example 1.

The operation data DB 52 and the reservation information DB 51 in Example 2 may also reside on adjacent servers or the same server as the unoccupied seat route search device 80 in the same manner as in Example 1.

INDUSTRIAL APPLICABILITY

In this system, a user may perform his own route search using a personal computer connected via the Internet, or a mobile telephone linked by a communication channel as a terminal, or an operator of a travel agency terminal may listen to and process the request of a customer.

In any of these cases, the desired route can be found without following the conventional manual steps of route searching followed by confirmation of unoccupied seats and confirmation of detailed conditions.

Particularly when a mobile telephone is used as the terminal, a billing device is also established, and reservations can therefore be made immediately after receiving the search results. Even in the limited display screen of a mobile telephone, the desired route is displayed first without any display of unnecessary routes, thereby providing the optimum search system.

From the perspective of the transportation facility, adapting to this system and providing unoccupied seat information will make it easier to acquire reservation customers, and passengers who in the past have moved into non-reserved seating due to full occupancy in the reserved seating can be directed to reserved seating in an alternate route. An increase in unit prices can also be anticipated.

The invention claimed is:

1. An unoccupied seat route search system for searching for and guiding in a route using a transportation mode from a departure point to a destination point on the basis of an inputted route search condition; said unoccupied seat route search system comprising:

an operation data database for storing service data of transportation modes;

a search operation data database for storing operation data for search;

reservation information collection means for collecting reservation information about said transportation modes;

wherein said reservation information collection means collects information regarding if there are any un-reserved seats in a reserved seating area;

condition inputting means for inputting route search conditions that include a seating condition;

route search means for referencing said operation data database used for searching, and searching for a transportation mode constituting a route on the basis of a route search condition and reservation information that is collected by the reservation information collecting means; and output means for outputting a result of the route search, wherein said route search means extracts a transportation mode having reservation information that matches a route search condition from said database of service data prior to a route search, forms a database of service data used for searching, and performs a route search.

2. The unoccupied seat route search system according to claim 1, characterized in that said condition inputting means has means for inputting a seating condition according to which all transportation modes are unoccupied and available for reservation.

3. The unoccupied seat route search system according to claim 1, characterized in that said condition inputting means has means for inputting a seating condition according to which a transportation mode is unoccupied when the transportation mode is available for reservation.

4. The unoccupied seat route search system according to claim 1, characterized in that said condition inputting means has means for inputting a seating condition according to which a transportation mode is designated as a route when the transportation mode has non-reserved seating, even when the transportation mode is fully occupied and unavailable for reservation.

5. The unoccupied seat route search system according to claim 1, characterized in that said condition inputting means has means for inputting a seating condition according to which a transportation mode can be utilized without a reservation.

6. The unoccupied seat route search system according to claim 1, characterized in that said condition inputting means has means for inputting a seating condition according to which the non-reserved seating can be designated as a route when the transportation mode has non-reserved seating, even when the transportation mode is available for reservation and has unoccupied seating.

7. An unoccupied seat route search device for referencing service data from a operation data database in which service data are stored, and searching a route using a transportation mode from a departure point to a destination point on the basis of a route search condition that includes a seating condition;

said unoccupied seat route search device characterized in comprising:

a search operation data database for storing operation data for search;

reservation information collection means for collecting reservation information about said transportation modes;

wherein said reservation information collection means collects information regarding if there are any un-reserved seats in a reserved seating area;

condition inputting means for inputting route search conditions that include a seating condition;

route search means for referencing said operation data database used for searching, and searching for a transportation mode constituting a route on the basis of a route search condition and reservation information that is collected by the reservation information collecting means; and output means for outputting a result of the route search, wherein said route search means extracts a transportation mode having reservation information that matches a route search condition from said database of service data prior to a route search, forms a database of service data used for searching, and performs a route search.

8. The unoccupied seat route search device according to claim 7, characterized in inputting a search condition that includes a seating condition according to which all transportation modes are unoccupied and available for reservation.

9. The unoccupied seat route search device according to claim 7, characterized in inputting a search condition that includes a seating condition according to which a transportation mode is unoccupied when the transportation mode is available for reservation.

10. The unoccupied seat route search device according to claim 7, characterized in inputting a search condition that includes a seating condition according to which a transportation mode is designated as a route when the transportation mode has non-reserved seating, even when the transportation mode is fully occupied and unavailable for reservation.

11. The unoccupied seat route search device according to claim 7, characterized in inputting a search condition that includes a seating condition according to which a transportation mode can be utilized without a reservation.

12. The unoccupied seat route search device according to claim 7, characterized in inputting a search condition that includes a seating condition according to which the non-reserved seating is designated as a route when the transportation mode has non-reserved seating, even when the transportation mode is available for reservation and has unoccupied seating.

13. A terminal device comprising:

a search operation data database for storing operation data for search;

reservation information collection means for collecting reservation information about said transportation modes; and wherein said reservation information collection means collects information regarding if there are any un-reserved seats in a reserved seating area;

route search means for referencing said operation data database used for searching, and searching for a transportation mode constituting a route on the basis of a route search condition and reservation information that is collected by the reservation information collecting means, wherein the route search device, prior to a route search, transmits a search condition to an unoccupied seat route search device in which said route search means extracts a transportation mode having reservation information that matches a route search condition from said database of service data, forms a database of service data used for searching, and performs a route search;

said terminal device characterized in comprising inputting means for inputting a route search condition that includes a seating condition.

14. The terminal device according to claim 13, characterized in that said condition inputting means has means whereby the fact that all transportation modes are unoccupied and available for reservation is inputted as a seating condition.

15. The terminal device according to claim 13, characterized in that said condition inputting means has means whereby availability of unoccupied seats is inputted as a seating condition in cases in which the transportation mode is available for reservation.

16. The terminal device according to claim 13, characterized in that said condition inputting means has means for inputting a seating condition according to which a transportation mode is designated as a route when the transportation mode has non-reserved seating, even when the transportation mode is fully occupied and unavailable for reservation.

17. The terminal device according to claim 13, characterized in that said condition inputting means has means for inputting a seating condition according to which a transportation mode can be utilized without a reservation.

18. The terminal device according to claim 13, characterized in that said condition inputting means has means for inputting a seating condition according to which the non-reserved seating is designated as a route when the transportation mode has non-reserved seating, even when the transportation mode is available for reservation and has unoccupied seating.

* * * * *